May 6, 1930.  W. H. CARSON  1,757,234
MIXING, HEATING, AND DISTRIBUTING UNIT FOR CONFECTIONS
Filed May 25, 1929
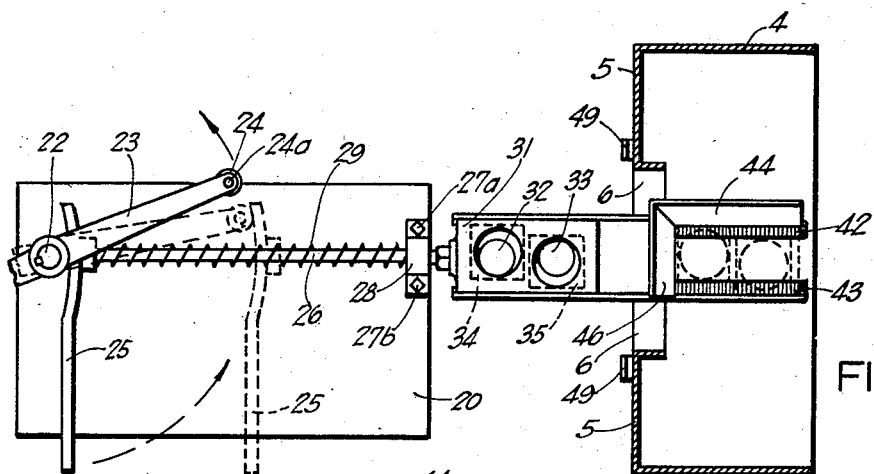
FIG. 1.
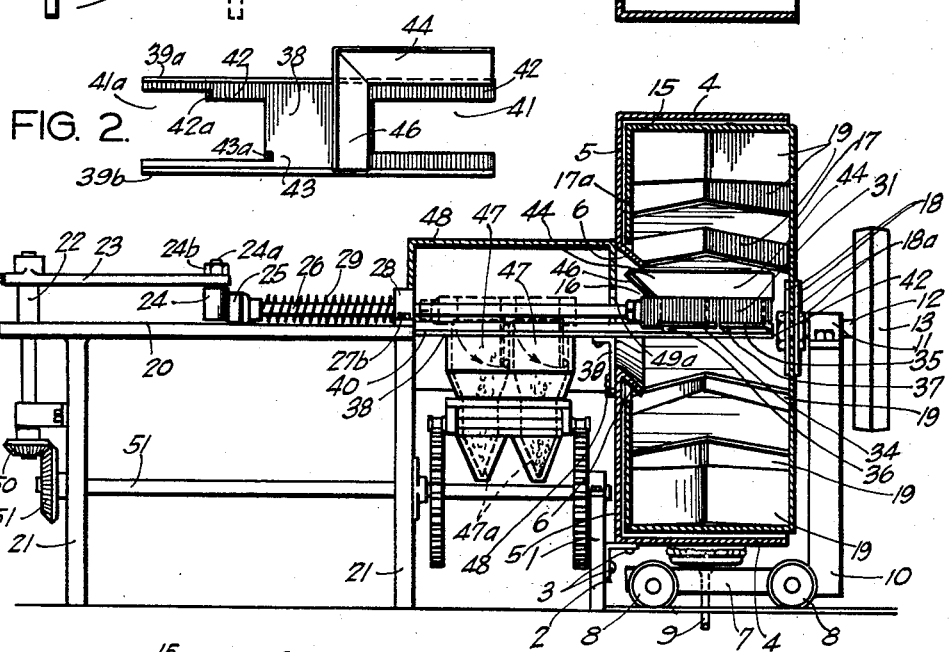
FIG. 2.
FIG. 3.
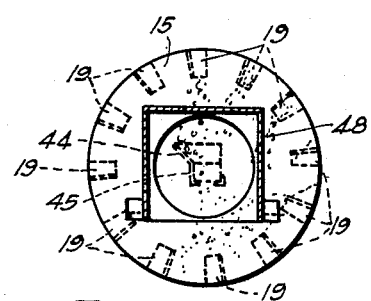
FIG. 4.
William H. Carson INVENTOR
BY Loyal J. Miller ATTORNEY Patented May 6, 1930

1,757,234

UNITED STATES PATENT OFFICE

WILLIAM H. CARSON, OF NORMAN, OKLAHOMA

MIXING, HEATING, AND DISTRIBUTING UNIT FOR CONFECTIONS

Application filed May 25, 1929. Serial No. 366,050.

This invention relates to heating, mixing and distributing unit for confection, particularly that class known as pop-corn confection.

The objects of my invention are to provide a device of this class which will be new, novel, practical and of utility; which will provide a drum and other means for mixing popcorn and syrup, or such like content; which will provide a means for heating said content during the mixing process; which will provide a means for withdrawing the said content in measured quantities from the said drum; which will provide a means for depositing said measured quantity in any desired containers; which delivery will be automatic; which will be durable; which will be efficient in accomplishing all the purposes for which it is intended.

This invention is one of a series by this applicant relating to the placing of a machine on the market for forming, preserving and sealing a pop-corn confection and the like, or other nature. This particular application relates to the mixing, heating and measuring and delivering means.

With these and other objects in view as will more fully appear my invention consists in the construction, novel features, and combination of parts hereinafter more fully described, pointed out in the claims hereto appended, and illustrated in the accompanying one-sheet drawing, of which, Figure 1 is a plan view of the measuring and conveying block, with the drum housing shown in section.

Fig. 2 is a plan view of the scraping member and track upon which the measuring and conveying block rides.

Fig. 3 is an elevational view of the device, showing the drum and drum housing in section.

Fig. 4 is an elevational view of the mixing and heating drum showing mixing blades, and the position of scraping member dotted in.

Like characters of reference designate like parts in all the figures.

It is understood that various changes in the form, proportion, size, shape, weight and other details of construction, within the the scope of my invention may be resorted to without departing from the spirit or broad principle of my invention and without sacrificing any of the advantages thereof; and it is also understood that the drawings are to be interpreted as being illustrative and not restrictive.

A practical embodiment of the invention as illustrated in the drawings includes:

Upon a suitable base 1 of any desired form and material, attached by a plurality of brackets 2 through means of bolts or studs 3 or such like method, is drum housing 4. Said drum housing 4 is cylindrical in form made of any suitable material such as sheet metal and the like, and has one of its ends entirely open. Attached to said drum housing 4, by any usual means or made integral therewith, is end 5 having, adjacent its central portion, a circular opening around which is provided inwardly and downwardly extending flange 6.

Truck platform 7 is mounted upon wheels 8. Attached to, or made integral with said truck platform 7 and perpendicular thereto, are standards 10. Converging at the top said standards 10 form a support for bearing 11. Said truck may be made of any suitable design or form for supporting said bearing 11. Through said bearing 11 and supported by same, extends drive shaft 12. Mounted upon the outwardly extending portion of said drive shaft 12 and rigidly attached thereto is drive pulley 13, for connecting by any usual means with a seat of power. Heating and mixing drum 15 is made of sheet metal or such like material, cylindrical in form and of such diameter as to fit within said drum housing 4 closely, allowing its rotation therewithin, but without contact therewith. The cylindrical length of said drum 15 is approximately that of the inside cylindrical length of said drum housing 4. Said drum 15 is provided with ends 17 and 17ª. A circular opening 16 is provided in said end 17ª adjacent the central portion thereof, said circular opening 16 being but slightly greater in circumference than the circumference encompassed by said flange 6 in said drum housing 4. Said end 17 is provided adjacent its central portion with a perforation and with annular plates 18. Said annular plates 18 are clamped one upon the inner and one upon the outer side of said end 11, by nuts 18$^a$, threaded upon said shaft 12. Within said drum 15 and attached by any desired means to its cylinder walls, are a plurality of V shaped mixing blades, on baffle plates 19. Said plates 19 are designed to pick up and lift the contents from the bottom of said drum 15, when same is rotated upon said shaft 12, and to drop said contents adjacent the center of said drum 15 when said blades 19, are at or near the top of their rotation.

Between the top of said truck platform 7 and the bottom portion of said drum housing 4 is provided heating unit 9 for applying heat to said drum housing 4. Said heating unit 9 is designed to give no interference with the movement of said truck platform 7 in and out beneath same. This unit is preferably a gas jet.

Table 20, supported by legs 21, is positioned at a desired distance from said drum housing 4 on the side nearest said opening 16. Upward through said table 20 extends shaft 22, the lower portion of which is connected with a seat of power. From the upper portion of, and activated by, said shaft 22 extends rotor arm 23, keyed to said shaft 22. On the under side of the free end of said rotor arm 23, I provide roller 24, operating upon axle 24$^a$ and secured thereto by holding means 24$^b$. Upon the top surface of said table 20, as is best shown in Fig. 1, and adjacent the end of same nearest said opening 16, and secured by bolts 27$^a$ and 27$^b$, is bearing 28. Through said bearing 28 operates reciprocal rod 26. Positioned upon said rod 26 is compression spring 29. At right angles thereto, positioned upon the end of said reciprocal rod 26, nearest said shaft 22, is positioned by any desired means not shown, arm 25, having the face of that portion of its length nearest its junction with said rod 26, cupped or shaped as a segment of a circle, the radius of which is the same as the sweep of said arm 23.

To the threaded end of said rod 26 nearest said opening 16, and held by lock nut 30 I provide measuring block 31, same being rectangular in shape and constructed of any suitable material such as wood, metal or the like. Provided in said block 31 are two circular bottomless staggered measuring cups 32 and 33. Said cups 32 and 33 have perpendicular walls and extend through said block 31 from top to bottom as is best shown in Fig. 1. Hinged by any usual means not shown upon the under side of said block 31 at desired points between said cups 32 and 33 is trap door 34; said trap door 34 being a flat plate sufficient in size to completely cover the bottom opening of said cup 32, and other than through means of said hinge, said trap door 34 is operatively free from any attachment to said block 31 or said cup 32. Said trap door 34 is designed to swing downwardly upon said hinge to open said cup 32 and to swing upwardly to close same. Hinged in a like manner upon the underneath side of said block 31 at desired points between said cup 33 and the end of said block 31 nearest said drum housing 5, I provide trap door 35. Said trap door 35 is of a shape and size and otherwise similar to said trap door 34, but is designed to open and close said cup 33. Extending downward upon the under side of said trap door 34 and adjacent that corner of same nearest said bolt 27$^a$ of said bearing 28 is lug 36. Extending downward upon the under side of said trap door 35 and adjacent that corner of same nearest said bolt 27$^b$ of said bearing 28 is lug 37. Said lugs 36 and 37 are designed to ride upon track member 38.

As may best be seen in Fig. 2 said track member 38 is rectangular in shape and bound longitudinally on its two outer sides by angle irons 39$^a$ and 39$^b$. The sides of said angle irons extend upwardly along the outer sides of said track member 38 forming a guide for the longitudinal sweep of said measuring and conveying block 31. Said track 38 is positioned by any usual means at one of its ends, upon said table 20 at a point shown as 40. Its other end 42 extends horizontally through said opening 16 into said drum housing 4, to a point adjacent the position taken by said end 17 of said drum 15 when said drum is within said housing 4. Said track member 38 is supported underneath its central portion by bracket 39 rigidly attached by any usual means such as rivets to said drum housing 4. That end of said track member 38 extending within said drum housing 4 is bifurcated to form a rectangular recess as shown at 41. That portion of said track member 38 between said table 20 and said drum housing 4 is so bifurcated as to form a stepped recess shown as 41$^a$. The sides of said recess 41$^a$ form a long track 42 for the travel of said lug 36 positioned under said trap door 34, and a shorter track 43 for the travel of said lug 37 positioned under said trap door 35. Said recess 41$^a$ provides an opening for the operation of said trap doors 34 and 35. It will be understood that when said lug 36 in its movement way from said drum housing 4, reaches the end 42$^a$ of said track 42, that said door 34 will swing downward and thus open said cup 32, and that simultaneously said lug 37 will reach the end 43$^a$ of said track 43, thus opening said trap door 35 to said cup 33. The portion of the side of said track 42 which lies along said rectangular recess 41 is extended upwardly, as best seen in Fig. 4 as shown at 45, and at its top is provided with upwardly and outwardly extending flange 44. Said flange 44 extends across and above said track 42 at right angles thereto as shown at 46. Said flanges 44 and 46 form a hopper for directing the flow of the content being mixed in said drum 15, toward and into said cups 32 and 33 when said block 31 is fully within said drum 15. The bottom edge of said flange 46 is positioned at the height above said track 42 to barely allow the passage of said block 31 between said track 42 and said flange 46. Said bottom edge of said flange 46 acts as a scraper for striking off surplus mixed content which has been deposited upon said block 31 and has overfilled said cups 32 and 33. Positioned beneath the under side of said track member 38 are receiving hoppers 47. Said hoppers 47 are positioned directly under the recess 41ª and are, respectively, in vertical alinement with trap doors 34 and 35 when same have reached the end of their travel away from said drum 15. Said receiving hoppers are of a size and shape to permit the free downward swing therein of said trap doors 34 and 35, as indicated by the arrows in Fig. 3, so as to receive the said mixed content of said cups 32 and 33 and to further convey said mixed content downward to be then received by a conveyor shown as 47ª.

For sanitary protection and for the purpose of conserving the heat in and from said drum 15 I provide housing 48. Said housing 48 composed of sheet metal or such like has the form of an inverted box, one end of same being supported by cleats 49 on drum housing 4, the opposite end being supported upon said table 20. That end of said housing 48 adjacent said drum housing 4 is provided with an opening 49ª designed to permit the passage of said block 31. The bottom portion of said housing 48 is left open.

In operation said drum 15 is charged with content to be mixed. Rolling upon said wheels 8 and supported by said truck 7 and said standard 10, said drum 15 is inserted in said drum housing 4. Heat is applied by means of said heating unit 9; power is applied through means of said pulley 13, and said drum 15 rotates upon said shaft 12. Picked up from the bottom of said drum 15 by said V shaped mixing blades 19 the desired content is carried to a position at or near the top of said drum 15, at which point or points it is poured downwardly, only to be picked up by other of said blades 19 and thus mixed.

At regular intervals said cups 32 and 33 on said conveyor block 31 are pushed into said drum 15 through said opening 16, said blocks 31 riding upon said tracks 42 and 43. This movement is accomplished by the action of said rotor arm 23 and said roller 24 upon arm 25 through the medium of reciprocating rod 26. Due to the said cupped or curved face of said arm 25 it will be understood that conveyor block 31 will have a certain period of rest when same is within said drum 15, thus allowing said cups 32 and 33 to be filled with said content spilled or poured from above as previously described.

It will be further understood that said doors 34 and 35 under said cups 32 and 33 are held in a closed position by the riding of said lugs 36 and 37 upon said tracks 42 and 43 at all points of travel except said points 42ª and 43ª, respectively.

It will further be understood that when said roller 24 upon said rotor arm 23 reaches that part of its motion where it breaks contact with the curved face of said arm 25, that said arm 25 and said reciprocating rod 26 will be released to the action of said compression spring 29. The said action of said spring 29 against said arm 25 will cause said arm 25, together with said reciprocating rod 26 and said conveyor block 31 to travel toward said shaft 22 a predetermined distance, thus withdrawing said cups 32 and 33 from said drum 15, to a point directly above said receiving hoppers 47. Upon reaching this said position said lugs 36 and 37 drop from points 42ª and 43ª on said tracks 42 and 43, allowing said trap doors 34 and 35 to open downwardly through said recess 41ª, thus depositing contents of said cups 32 and 33 into said hoppers 47.

It will also be understood that when said conveyor block 31 starts upon its travel toward said drum 15, that said trap doors 34 and 35 will be closed by their action upon said ends 42ª and 43ª which are curved slightly downward.

It will be further understood that said shaft 22 acts through the means of a pinion 50 in propelling said arm 23. Said pinion 50 to be connected to a seat of power by means shown as 51.

After said content has been deposited within said hoppers 47, it passes into said conveyor 47ª, which is of any desired design, and is not a part of this invention.

Obviously, the invention is susceptible of embodiment in forms other than that which is illustrated in the accompanying drawings and described herein, and applicable for uses and purposes other than as detailed, I therefore consider as my own all such modifications and adaptations and other uses of the form of the device other than as herein described as fairly fall within the scope of my invention.

Having thus described my invention what is claimed and desired to be secured by Letters Patent, is:

1. A device, as described, embodying a rotating interiorly baffled drum for mixing confections, a housing for said drum adapted to be heated for heating said confections while being mixed, a reciprocating conveyor block forming a plurality of cups, adapted to enter said drum, receive a portion of mixed confection and to withdraw from said drum and deposit said confection in desired containers, all as and for the purposes specified.

2. A device, as described, embodying a singly centrally perforated, vertically rotatable, interiorly baffled, hollow, cylindrical, mixing drum operatively mounted upon a manually portable wheeled truck, an open ended, singly centrally perforated, stationarily mounted housing for removably receiving said drum, a reciprocating conveyor block forming a plurality of cups, adapted to enter said drum, receive a portion of mixed confection and to withdraw from said drum and deposit said confection in desired containers, all as and for the purposes specified.

3. A device, as described, embodying a singly centrally perforated, vertically rotatable, interiorly baffled, hollow, cylindrical, mixing drum operatively mounted upon a manually portable wheeled truck, an open ended, singly centrally perforated, stationarily mounted housing for removably receiving said drum, a table, a track from said table to within said drum, a reciprocating rod bearing a conveyor block having a plurality of staggered cups formed therein said cups adapted to receive a content from said drum, arm and roller power means for reciprocating said rod, hinged doors for said cups adapted to gravitationally open and deposit said content through said track between said table and said drum, means for heating the contents of said drum, all as and for the purposes specified.

4. A device, as described, embodying, a wheeled truck having upright standards at one of its ends, operatively supporting a drive shaft, a cylindrical mixing drum centrally mounted on one of its ends on said shaft its other end centrally perforated, a plurality of baffle plates within said drum, a stationary cylindrical housing for said drum having an open end for receiving said drum and a central flanged opening in its other end, a table having a vertical shaft operatively positioned through its top, a rotating arm one end mounted upon said vertical shaft, a roller mounted adjacent the free end of said arm, a bearing upon said table, a reciprocating arm its central portion operatively positioned in said bearing, a compression spring for said reciprocating arm, said reciprocating arm adapted to reciprocate by contact with said roller and the action of said spring, a conveyor block upon the free end of said reciprocating arm forming a plurality of cups for receiving a content from said drum, a track extending from said table to within said drum upon which said block is adapted to reciprocate, a hinged bottom for each of said cups adapted to be opened by said track to discharge said content at predetermined points between said table and said drum, all as and for the purposes specified.

5. A device, as described, in combination, a wheeled truck having upright standards at one of its ends operatively supporting a drive shaft, a cylindrical mixing drum centrally mounted on one of its ends on said shaft its other end centrally perforated, a plurality of baffle plates within said drum, a stationary cylindrical housing for said drum having an open end for receiving said drum and a central flanged opening in its other end, a table having a vertical shaft operatively positioned through its top, a rotating arm one end mounted upon said vertical shaft, a roller mounted adjacent the free end of said arm, a bearing upon said table, a reciprocating arm its central portion operatively positioned in said bearing, a compression spring for said reciprocating arm, said reciprocating arm adapted to reciprocate by contact with said roller and the action of said spring, a conveyor block upon the free end of said reciprocating arm forming a plurality of cups for receiving a content from said drum, a track extending from said table to within said drum upon which said block is adapted to reciprocate, a hinged bottom for each of said cups adapted to be opened by said track to discharge said content at predetermined points between said table and said drum, all as and for the purposes specified.

6. A device, as described, in combination, a wheeled truck having upright standards at one of its ends operatively supporting a drive shaft, a cylindrical mixing drum centrally mounted on one of its ends on said shaft its other end centrally perforated, a plurality of baffle plates within said drum, a stationary cylindrical housing for said drum having an open end for receiving said drum and a central flanged opening in its other end, a table having a vertical shaft operatively positioned through its top, a rotating arm one end mounted upon said vertical shaft, a roller mounted adjacent the free end of said arm, a bearing upon said table, a reciprocating arm its central portion operatively positioned in said bearing, a compression spring for said reciprocating arm, said reciprocating arm adapted to reciprocate by contact with said roller and the action of said spring, a conveyor block upon the free end of said reciprocating arm forming a plurality of cups for receiving a content from said drum, means for striking off surplus content from said cups, a track extending from said table to within said drum upon which said block is adapted to reciprocate, a hinged bottom for each of said cups adapted to be opened by said track to discharge said content at predetermined points between said table and said drum, all as and for the purposes specified.

WILLIAM H. CARSON.